United States Patent
Wilson et al.

(10) Patent No.: US 11,221,984 B2
(45) Date of Patent: Jan. 11, 2022

(54) SELF-DESCRIBING INTERFACES FOR COMMUNICATION WITH GATEWAYS

(71) Applicant: Microsoft Technology Licensing, LLC, Redmond, WA (US)

(72) Inventors: Mei L. Wilson, Redmond, WA (US); Ajay Preetham Barboza, Woodinville, WA (US); Shyamal Kaushik Varma, Issaquah, WA (US); Alessandro Domenico Scarpantoni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 16/241,246

(22) Filed: Jan. 7, 2019

(65) Prior Publication Data

US 2020/0218691 A1    Jul. 9, 2020

(51) Int. Cl.
| G06F 16/11 | (2019.01) |
| G06F 16/25 | (2019.01) |
| H04L 12/851 | (2013.01) |
| H04L 29/08 | (2006.01) |

(52) U.S. Cl.
CPC .......... *G06F 16/116* (2019.01); *G06F 16/258* (2019.01); *H04L 47/2441* (2013.01); *H04L 67/1061* (2013.01)

(58) Field of Classification Search
None
See application file for complete search history.

(56) References Cited

U.S. PATENT DOCUMENTS

| 9,612,815 B1* | 4/2017 | Jagtap ................... G06F 16/283 |
| 2002/0133694 A1 | 9/2002 | Ray et al. |
| 2004/0073912 A1* | 4/2004 | Meza .................... G06F 16/258 |
| 2005/0060169 A1* | 3/2005 | Gangadharan .......... G06F 16/25 |
| 2007/0283317 A1* | 12/2007 | Sadler ................... G06F 16/252 |
| 2009/0063718 A1 | 3/2009 | Sekine et al. |
| 2010/0138417 A1* | 6/2010 | Ma .......................... G06F 16/48 707/736 |
| 2011/0119687 A1* | 5/2011 | McGovern .......... G06F 16/1873 707/695 |
| 2013/0145061 A1* | 6/2013 | Parivar .................... G06F 16/11 |
| 2016/0164953 A1* | 6/2016 | Hristov ................... G06F 16/18 709/203 |
| 2016/0191485 A1* | 6/2016 | Rajangam ............. G06F 16/178 707/610 |
| 2017/0052688 A1 | 2/2017 | Evans et al. |
| 2017/0064042 A1 | 3/2017 | Vora et al. |

(Continued)

OTHER PUBLICATIONS

"International Search Report and Written Opinion Issued in PCT Application No. PCT/US19/067302", dated Mar. 25, 2020, 12 Pages.

(Continued)

*Primary Examiner* — Son T Hoang
(74) *Attorney, Agent, or Firm* — Arent Fox LLP

(57) ABSTRACT

In one aspect, a request is sent to a device for a device descriptor that describes custom interfaces. The custom interfaces may be expressed according to a defined data structure. The device descriptor that describes the custom interfaces is received at a gateway. An interface agnostic application is executed to translate the device descriptor to the custom interfaces for consumption of the data described by the custom interfaces.

19 Claims, 5 Drawing Sheets

(56) References Cited

U.S. PATENT DOCUMENTS

2017/0083386 A1    3/2017  Wing et al.
2017/0244814 A1    8/2017  Yin et al.
2018/0096031 A1*   4/2018  Stanley ............. G06F 16/24542
2018/0181420 A1*   6/2018  Kutch .................. G06F 16/116

OTHER PUBLICATIONS

"About Samsung Enterprise Gateway", Retrieved From: https://seap.samsung.com/html-docs/android-cloud/Content/About_Samsung_Enterprise_Gateway.htm, Oct. 30, 2018, 7 Pages.

"Device Connectivity Guide for Oracle Internet of Things Cloud Service", Retrieved From: https://docs.oracle.com/en/cloud/paas/iot-cloud/develop/device-connectivity-guide-oracle-internet-things-cloud-service.pdf, Sep. 2018, 138 Pages.

"Getting Device State", Retrieved From: https://cloud.google.com/iot/docs/how-tos/config/getting-state, Oct. 30, 2018, 3 pages.

"Overview of Internet of Things", Retrieved From: https://cloud.google.com/solutions/iot-overview, Apr. 27, 2016, 18 Pages.

"Understand State Reporting for a Smart Home Skill", Retrieved From:https://developer.amazon.com/docs/smarthome/state-reporting-for-a-smart-home-skill.html, 58 Pages.

"Understand the Smart Home Skill API", Retrieved From:https://web.archive.org/web/20171031120906/https://developer.amazon.com/docs/smarthome/understand-the-smart-home-skill-api.html, Oct. 31, 2017, 11 Pages.

Wang, et al., "A Smart Home Gateway Platform for Data Collection and Awareness", In Journal of Computing Research Repository, Apr. 5, 2018, 14 Pages.

\* cited by examiner

SELF-DESCRIBING INTERFACES FOR COMMUNICATION WITH GATEWAYS

BACKGROUND

Gateways typically use standard protocols to interface with peripheral devices to enable communication between the gateways and the peripheral devices. Interfaces exposed by the peripheral devices are either standardized by industry or require additional software to be installed on the gateways to interpret the data described by the interfaces. As such, current technology for interpreting data between gateways and peripheral devices requires that solutions be implemented for both the gateways and the peripheral devices; ultimately resulting in more development and software quality assurance to design and implement a solution. As such, current technology for interpreting data between gateways and peripheral devices may be time consuming and inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for agnostically interpreting data. In one example, a method for agnostically interpreting data is provided. A request is sent to a device for a device descriptor that describes one or more custom interfaces. The one or more custom interfaces may be expressed according to a defined data structure. The device descriptor that describes the one or more custom interfaces is received. An interface agnostic application is executed to translate the device descriptor to the one or more custom interfaces.

In another aspect, a request is sent to a device for a first device descriptor that describes a first custom interface. The first device descriptor describing the first custom interface is received. An interface agnostic application is executed to translate the first device descriptor to the first custom interface. Another request is sent to the device for a second device descriptor that describes at least the first custom interface and a second custom interface. The second device descriptor describing at least the first custom interface and the second custom interface is received. The interface agnostic application is executed to translate the second device descriptor to at least the first custom interface and the second custom interface.

In yet another aspect, a request is sent to a first device for a device descriptor corresponding to the first device that describes one or more custom interfaces of the first device. The device descriptor corresponding to the first device is received. An interface agnostic application is executed to translate the device descriptor corresponding to the first device to the one or more custom interfaces of the first device. Another request is sent to a second device for a device descriptor corresponding to the second device that describes one or more custom interfaces of the second device. The device descriptor corresponding to the second device is received. The interface agnostic application is executed to translate the device descriptor corresponding to the second device to the one or more custom interfaces of the second device.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
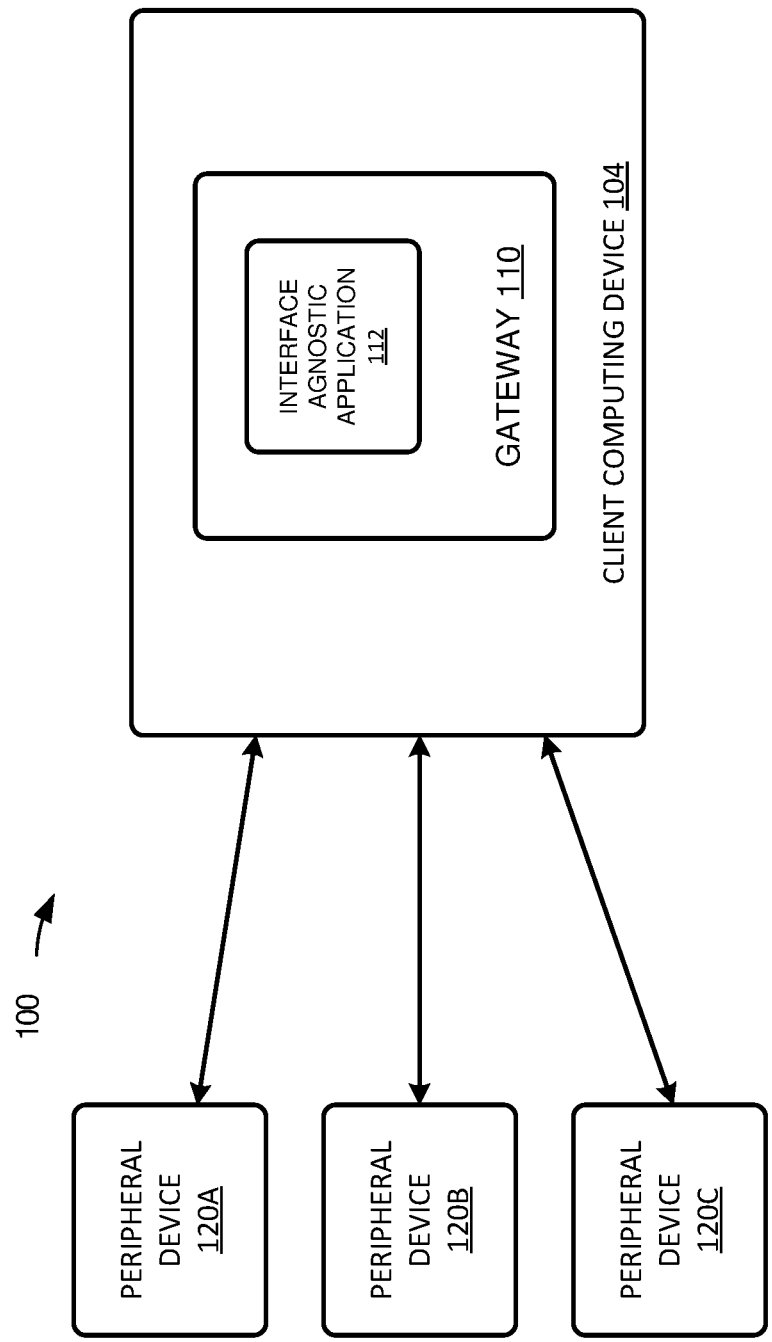
FIG. 1 illustrates an exemplary self-described interface system for agnostically interpreting data, according to an example aspect.

Aspects of the disclosure are generally directed to agnostically interpreting data. For example, data from peripheral devices connected to a gateway may be read and interpreted by the gateway without the gateway having prior knowledge of the peripheral devices. In this regard, a peripheral device that the gateway and/or the operating system on the gateway and/or software applications installed on the gateway have no advanced knowledge of can self-describe its functionality, features, and/or capabilities according to a defined data format that can be read, parsed, and understood by the gateway. As such, when a peripheral device connects to the gateway, the gateway does not need to receive information from the peripheral device that indicates what type of device it is. The gateway notices that a peripheral device is connected (e.g., either automatically or via a physical port number specified to the gateway) and asks the peripheral device (e.g., by sending a request for a device descriptor) for features or capabilities to report and the properties associated with the features or capabilities. In this regard, a device builder, for example, can build a device that communicates with a gateway without implementing a solution for the gateway and/or any interface solutions for the device to communicate with a cloud environment. The peripheral device can dynamically report its functionality and capabilities to the gateway without providing a solution to read and interpret the data on the gateway.

As discussed above, gateways typically use standard protocols to interface with peripheral devices to enable communication between the gateways and the peripheral devices. Interfaces exposed by the peripheral devices are either standardized by industry or require additional software to be installed on the gateways to interpret the data described by the interfaces. As such, current technology for interpreting data between gateways and peripheral devices requires that solutions be implemented for both the gateways and the peripheral devices; ultimately resulting in more development and software quality assurance to design and implement a solution. Current technology for interpreting data between gateways and peripheral devices may be time consuming and inefficient.

Accordingly, as described herein, a request may be sent from a gateway to a device for a device descriptor that describes one or more custom interfaces. In one example, the one or more custom interfaces are expressed according to a defined data structure. As discussed above, the device may report its functionality and capabilities to the gateway. In this regard, the one or more custom interfaces may describe the functionality and capabilities of the device. In one example, the custom interfaces may describe at least one of a property, an event, a command, a method definition, and the payload data from the device. After sending the request to the device for a device descriptor, the gateway may receive the device descriptor describing the one or more custom interfaces. When the gateway receives the device descriptor from the device, the gateway may execute an interface agnostic application to translate the device descriptor to the one or more custom interfaces.

In examples, the interface agnostic application is agnostic to device and/or interface metadata. The metadata may include data such as the type of device or interface, the version of the device or interface, manufacturing information associated with the device or interface, and the like. As such, as discussed above, the gateway requires no prior knowledge of the device to read and interpret the data from the device. Furthermore, current existing solutions for interpreting data at a gateway from a connected device require that the device builder provide a solution (e.g., software) on the gateway that is capable of reading and interpreting the data from the device. When a connected device includes standardized interfaces for reporting data, standardized software/solutions are required to be provided at the gateway. Thus, solution/software has to be provided and implemented at both the peripheral device and the gateway in order for the data from the device to be read and interpreted by the gateway. Accordingly, a technical effect that may be appreciated is that peripheral device and gateway technology is improved via the techniques disclosed herein by providing a solution for peripheral devices to self-describe interfaces/data that can be interpreted by a gateway processing system without requiring installation of software on the gateway to interpret the interfaces/data. In this regard, the solution described herein is necessarily rooted in computer technology in order to overcome a problem specifically arising in the realm of peripheral device and computer/gateway communication to interpret and understand data communicated between peripheral devices and gateways/computers.

In other aspects, the gateway may receive payload data (e.g., raw data) associated with the one or more custom interfaces from the device. For example, after the initial communication/handshake between the device and the gateway (e.g., after the device descriptor has been received and processed by the gateway), the device may send raw data described by the one or more custom interfaces to the gateway for further processing. In one example, when the payload data is received, the gateway may parse the payload/raw data for local use and/or exposure to a cloud environment. The gateway may expose the payload data to a local application for consumption. In another example, the gateway may expose the payload data to a cloud environment for consumption. In one configuration, the gateway may send a command to the device based on an analysis of the payload data to interact with and/or control the device.

When a new version of software has been implemented on the device and a new interface or interfaces describing the device is/are reported/sent to the gateway, the gateway can parse and interpret the new interfaces and/or data described by the new interfaces without requiring that the new version of software be implemented/installed on the gateway. As discussed above, in current existing technology, when a new version of software is implemented on a device connected to and in communication with the gateway, the new version of the software is also implemented on the gateway in order for the gateway to interpret and understand data associated with the new version of software. As such, another technical effect that may be appreciated is that by providing a solution where the gateway can parse and interpret data from a connected peripheral device without requiring implementation/installation of software that can interpret the data on the gateway (e.g., for every new version of software implemented on the peripheral device), less computing resources are utilized. For example, by not requiring that new software/applications be installed on the gateway to interpret the data, processor load may be reduced and memory may be conserved. As such, the technology described herein facilitates an improvement to the computer itself.

Furthermore, the solution described herein is other than what is well-understood, routine and conventional in the field of peripheral device and gateway/computer communication/data interpretation. Another technical effect that may be appreciated is that by translating the device descriptor to one or more custom interfaces that can be exposed to a cloud environment by the gateway, networking bandwidth usage is reduced. For example, the solution described herein minimizes the volume of data that has to be sent via the cloud, which minimizes response times and network transmission costs.

Referring now to the drawings, in which like numerals represent like elements through the several figures, aspects of the present disclosure and the exemplary operating environment will be described. With reference to FIG. 1, one aspect of a self-described interface system 100 for agnostically interpreting data is illustrated. The self-described interface system 100 may include a client computing device 104 and a plurality of peripheral devices 120A-120C. In aspects, the self-described interface system 100 may be implemented on the client computing device 104. In a basic configuration, the client computing device 104 is a handheld computer having both input elements and output elements. The client computing device 104 may be any suitable computing device for implementing the self-described interface system 100 for agnostically interpreting data. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; a Raspberry Pi, a Minnow board. This list is exemplary only and should not be considered as limiting. Any suitable client computing device 104 for implementing the self-described interface system 100 for agnostically interpreting data may be utilized.

The various components may be implemented using hardware, software, or a combination of hardware and software. In aspects, the client computing device 104 may include a gateway 110 and an interface agnostic application 112. In some examples, the gateway 110 may comprise the client computing device 104. For example, the gateway 110 may comprise a personal computer, a tablet, a raspberry pi, a minnow board, and the like. In another example, the gateway 110 may comprise a software application. For example, the gateway 110 may comprise a software application run by the client computing device 104. In one case, the gateway 110 may be configured to serve as the intermediate connection point between the plurality of peripheral devices 120A-120C and a local application hosted by the gateway 110 and/or the client computing device 104. For example, the local application may be configured to consume data from the peripheral devices 120A-120C via the gateway 110.

In another example, the gateway 110 may be configured to serve as the intermediate connection point between the plurality of peripheral devices 120A-120C and a cloud environment. For example, the cloud environment may include a cloud computing service for building, testing, deploying, and managing applications and services, which will be discussed in more detail relative to FIG. 2. As such, the cloud environment may be configured to consume data from the peripheral devices 120A-120C via the gateway 110. In this example, the gateway 110 may perform analytics on data produced by the peripheral devices 120A-120C before it is exposed and sent to the cloud environment.

In other examples, the gateway 110 may be configured to send a request to a device (e.g., at least one of peripheral devices 120A-120C) for a device descriptor that describes one or more interfaces. The device may be any device that can be controlled by a microprocessor. The device may include the peripheral devices 120A-120C as illustrated in FIG. 1. The peripheral devices 120A-120C may include both external devices and internal devices (e.g., integrated devices) capable of connecting to the gateway 110. For example, the peripheral devices 120A-120C may include a camera, a variety of analog and digital sensors (e.g., temperature, moisture/humidity, light, color, noise, positioning, particles, pressure, altitude, security, motion and the like), custom sensors, microcontroller units such as an Arduino, Inter-integrated circuit (I2C) sensors, a motor controller, Universal Serial Bus (USB) devices, Human Interface devices (HID), Bluetooth devices, and the like. In one example, the connection to the gateway 110 may include a wired connection. In another example, the connection to the gateway 110 may include a wireless connection. In this regard, the connection to the gateway 110 may include a standard communication protocol such as serial ports (e.g., USB, RS-232), Wi-Fi, Bluetooth, Ethernet, and the like.

The peripheral devices 120A-120C may each include a device descriptor that describes one or more interfaces that are implemented by the peripheral devices 120A-120C. The one or more interfaces may be expressed according to a defined data structure. In one example, the defined data structure is in a JavaScript Object Notation (JSON) format. In another example, the defined data structure is in a defined binary data format. As such, the device descriptor may include a header followed by a list of descriptor entries. An entry marks either the start of a new interface definition or the start of a new property, event, or method definition within the previously started interface definition. Each entry begins with a single Entry Type field that provides an indication of the type of entry definition that follows. At least one interface is defined in the device descriptor and includes at least one of a property, an event, and a method definition. In one example, the device descriptor may describe between 1 and 256 interfaces that are implemented by a device (e.g., at least one of the peripheral devices 120A-120C). In this regard, the one or more interfaces describe at least one of a property, an event, and a method definition from the peripheral devices 120A-120C.

In some examples, the one or more interfaces implemented by the peripheral devices 120A-120C may be custom interfaces. A custom interface is an interface that is not defined/standardized by industry. For example, as discussed above, a device may include any device that can be controlled by a microprocessor. As such, one or more custom interfaces may be implemented by any device that can be controlled by a microprocessor. In one example, a custom interface is defined and/or expressed according to the defined data structure, as discussed above herein. In some examples, a new custom interface may be designed and implemented for a device. In other examples, an updated custom interface may be implemented for a device. In yet other examples, a new device including new custom interfaces may be designed and implemented such that the new device including the new custom interfaces can communicate and connect with the gateway 110. In these examples, the data described by the new and updated custom interfaces associated with the new and updated devices may be parsed, interpreted and understood by the gateway 110 (e.g., without requiring that software associated with the new and updated devices/interfaces for interpreting the data be installed on the gateway 110).

In another example, the gateway 110 may be configured to receive the device descriptor that describes the one or more interfaces from one or more of the peripheral devices 120A-120C. As discussed above, the connection to the gateway 110 may include a standard communication protocol such as serial ports (e.g., USB, RS-232), Wi-Fi, Bluetooth, Ethernet, and the like. In this regard, a first peripheral device (e.g., peripheral device 120A) may be a different type of device than a second peripheral device (e.g., peripheral device 120B) and/or a third peripheral device (e.g., peripheral device 120C). In another example, the peripheral device 120A is a different type of device than peripheral device 120B and peripheral device 120C. As such, peripheral device 120A may communicate via a first protocol, peripheral device 120B may communicate via a second protocol, and peripheral device 120C may communicate via a third protocol. For example, if peripheral device 120A is a USB camera, peripheral device 120A may be connected via a USB port on the gateway 110 and communicate via USB protocol. In another example, if peripheral device 120B is a Bluetooth device, the peripheral device 120B may communicate with the gateway 110 via a Bluetooth protocol. In another example, if the peripheral device 120C is a wireless device, the peripheral device 120C may communicate with the gateway 110 via a TCP/IP protocol.

As such, while the peripheral devices 120A-120C may communicate with the gateway 110 via standardized communication protocols, the interfaces implemented by the peripheral devices 120A-120C may not be standardized interfaces (e.g., they may be custom interfaces as described herein). Accordingly, the device descriptor may be received at the gateway 110 via a standard communication protocol while the interfaces described by the device descriptor are expressed according to the defined data format described herein. In contrast, in a standardized scenario, interfaces are expressed according to a standardized data format. For example, a Bluetooth device may communicate via a Bluetooth protocol and express its interfaces implemented by the device according to the Bluetooth standard for expressing Bluetooth interfaces.

As discussed above, the client computing device 104 and/or the gateway 110 may include an interface agnostic application 112. In this regard, when the device descriptor is received at the gateway 110, the gateway 110 and/or an operating system installed on the gateway 110 may be configured to execute the interface agnostic application 112. The interface agnostic application 112 may include any software and/or any software application that is capable of agnostically interpreting data from peripheral devices (e.g., peripheral devices 120A-120C) connected to a gateway (e.g., the gateway 110). For example, as discussed herein, the gateway 110 and/or the interface agnostic application 112 may interpret data from a variety of peripheral devices including peripheral devices that do not define functionality/data using industry standards. In another example, as discussed herein, the gateway 110 and/or the interface agnostic application 112 may interpret data from a variety of peripheral devices without having advanced knowledge of the peripheral devices (e.g., without requiring that software associated with the peripheral devices be installed and implemented on the gateway 110).

The data interpreted from the peripheral devices may include properties, events, methods, commands, and the like, described by the one or more interfaces and/or payload (e.g., raw) data. In this regard, the interface agnostic application 112 may be configured to translate a device descriptor to the one or more interfaces for local use and/or for exposure to a cloud environment. In one example, the interface agnostic application 112 is agnostic to peripheral device metadata. For example, the interface agnostic application 112 may be agnostic to metadata such as a peripheral device type, a version of the peripheral device, manufacturing information associated with the peripheral device, and the like. In another example, the interface agnostic application 112 is agnostic to interface metadata such as an interface type, a version of the interface, manufacturing information associated with the interface, and the like. As such, the interface agnostic application 112 may interpret data described by the one or more interfaces implemented by a peripheral device without prior knowledge of the peripheral device. In another example, the interface agnostic application 112 is configured to send a request to a device (e.g., at least one of peripheral devices 120A-120C) for a device descriptor that describes one or more interfaces, as described herein.

While FIG. 1 illustrates peripheral devices 120A-120C of the self-described interface system 100, the discussion of peripheral devices 120A-120C is exemplary only and should not be considered as limiting. Any suitable number and/or type of peripheral devices may be utilized in accordance with the present disclosure. For example, any suitable number and/or type of peripheral devices may connect with the gateway 110 such that data from the peripheral devices is interpreted and understood by the interface agnostic application 112.

Figure 2:
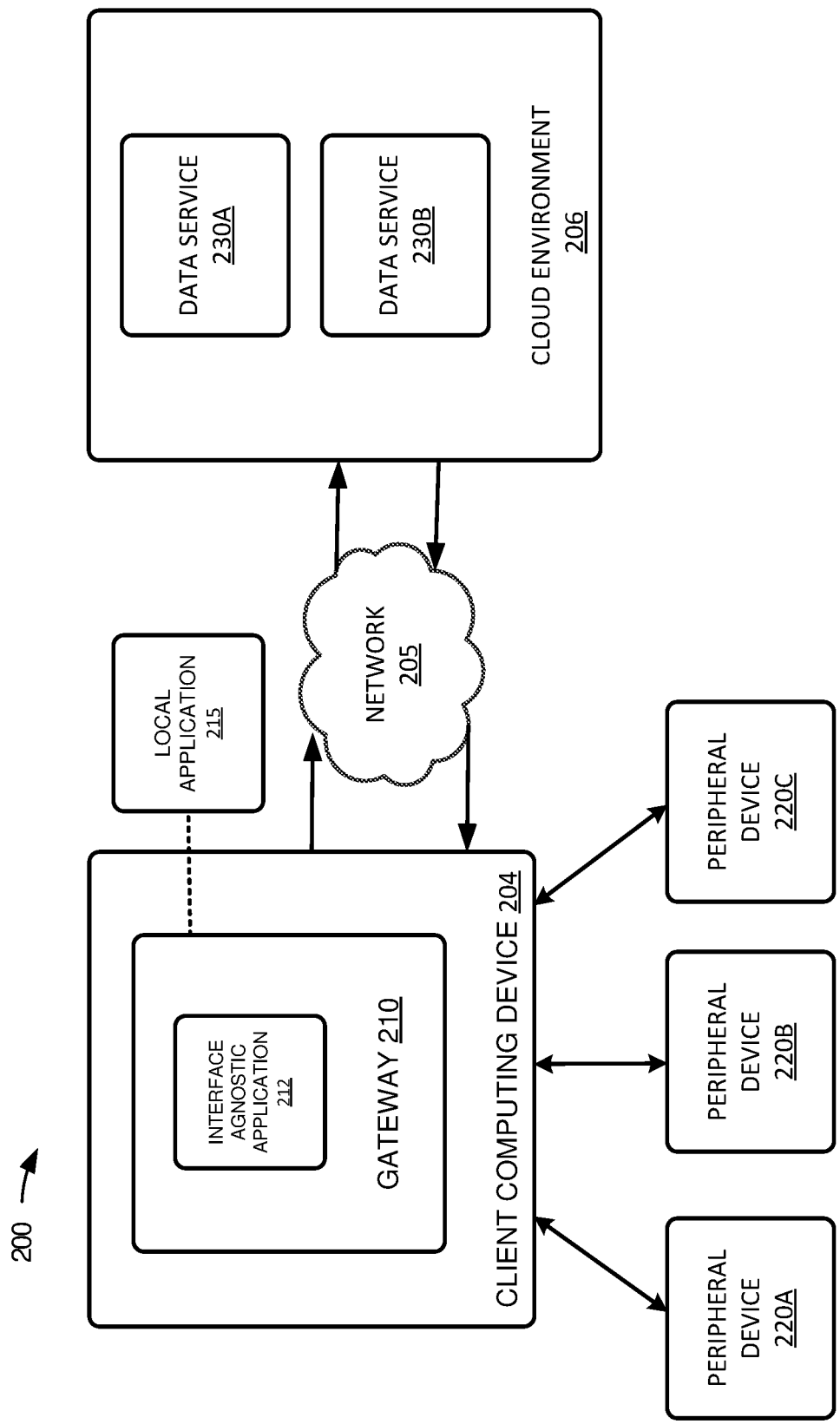
FIG. 2 illustrates another exemplary self-described interface system for agnostically interpreting data, according to an example aspect.

Referring now to FIG. 2, one aspect of a self-described interface system 200 for agnostically interpreting data is illustrated. The self-described interface system 200 may include a client computing device 204, a cloud environment 206, and a plurality of peripheral devices 220A-220C. The client computing device 204 may include a gateway 210, an interface agnostic application 212, and a local application 215. In aspects, the self-described interface system 200 may be implemented on the client computing device 204, for example, as described above herein relative to FIG. 1. In this regard, the client computing device 204, the peripheral devices 220A-220C, the gateway 210 and the interface agnostic application 212 may comprise and include all the functionality and features described above relative to the client computing device 104, the peripheral devices 120A-120C, the gateway 110 and the interface agnostic application 112 of FIG. 1.

In aspects, the self-described interface system 200 may be implemented in the cloud environment 206. The cloud environment 206 may provide data to and from the client computing device 204 through a network 205. In one example, the cloud environment 206 may include a cloud computing service for building, testing, deploying, and managing applications and services. For example, the cloud environment 206 may include a cloud computing service such as Azure®. In this regard, the cloud environment 206 may include the first data service 230A and the second data service 230B. The first data service 230A and the second data service 230B may be configured to provide a variety of functions and services including computing services, mobile services, storage services, data management, analytics, and the like. As such, the cloud environment 206 and/or the first data service 230A and the second data service 230B may be configured to consume data from the peripheral devices 220A-220C via the gateway 210. In one example, the gateway 210 may perform analytics on data produced by the peripheral devices 220A-220C before it is exposed and sent to the cloud environment 206.

The gateway 210 may receive payload data (e.g., raw data) associated with the one or more interfaces implemented by the peripheral devices 230A-230C. In one example, the one or more interfaces may describe the functionality of an interface associated with the cloud environment 206. For example, the one or more interfaces may describe the functionality of an Azure® IoT Plug and Play (PnP) interface. In this regard, the gateway 210 may parse the payload data for exposure to the cloud environment 206. In another example, the one or more interfaces may describe the functionality of an interface associated with the local application 215. For example, the local application 215 may be any application capable of consuming data described by one or more interfaces implemented by the peripheral devices 230A-230C. In this regard, the gateway 210 may parse the payload data for exposure to the local application 215.

In other examples, the gateway 210 may be configured to send one or more commands to the peripheral devices 230A-230C based on an analysis of the payload data. For example, in one scenario, when the payload (e.g., raw) data is associated with a light switch, in response to performing an analysis on the payload data, the gateway 210 may send a command to the light switch to turn on or off. In another example, at least one of the data services 230A-230B and/or a component and/or an interface associated with the cloud environment 206 may interact with and control the peripheral devices 230A-230C via the gateway 210. For example, at least one of the data services 230A-230B and/or a component and/or an interface associated with the cloud environment 206 may send one or more commands to the peripheral devices 230A-230C.

In aspects, the self-described interface system 200 may be implemented in more than one cloud environment 206, such as a plurality of cloud environments 206. As discussed above, the cloud environment 206 may provide data to and from the client computing device 204 through the network 205. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the self-described interface system 200 may be implemented as a web-based application. In one example, the web-based application may include any client-server software application where the client (e.g., user interface) runs in a web-browser and/or any component capable of rendering HTML, Flash, Silverlight, and the like.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera functionality for capturing and interpreting user gestures for controlling the functionality of the computing device, and the like.

In one example, the gateway 210 may be part of and/or located in the cloud environment 206. In another example, the gateway 210 may be part of and/or located at the first data service 230A and/or the second data service 230B. In one example, the first data service 230A and the second data service 230B may be part of and/or located at the client computing device 204. It is appreciated that although one cloud environment 206 is illustrated in FIG. 2, the self-described interface system 200 may include a plurality of cloud environments 206 with a plurality of data services (e.g., data service 230A and data service 230B). In some cases, the cloud environment 206 may include a plurality of data services (e.g., data service 230A and data service 230B). It is appreciated that although data service 230A and data service 230B are illustrated in FIG. 2, the self-described interface system 200 may include any number of data services.

Figure 3:
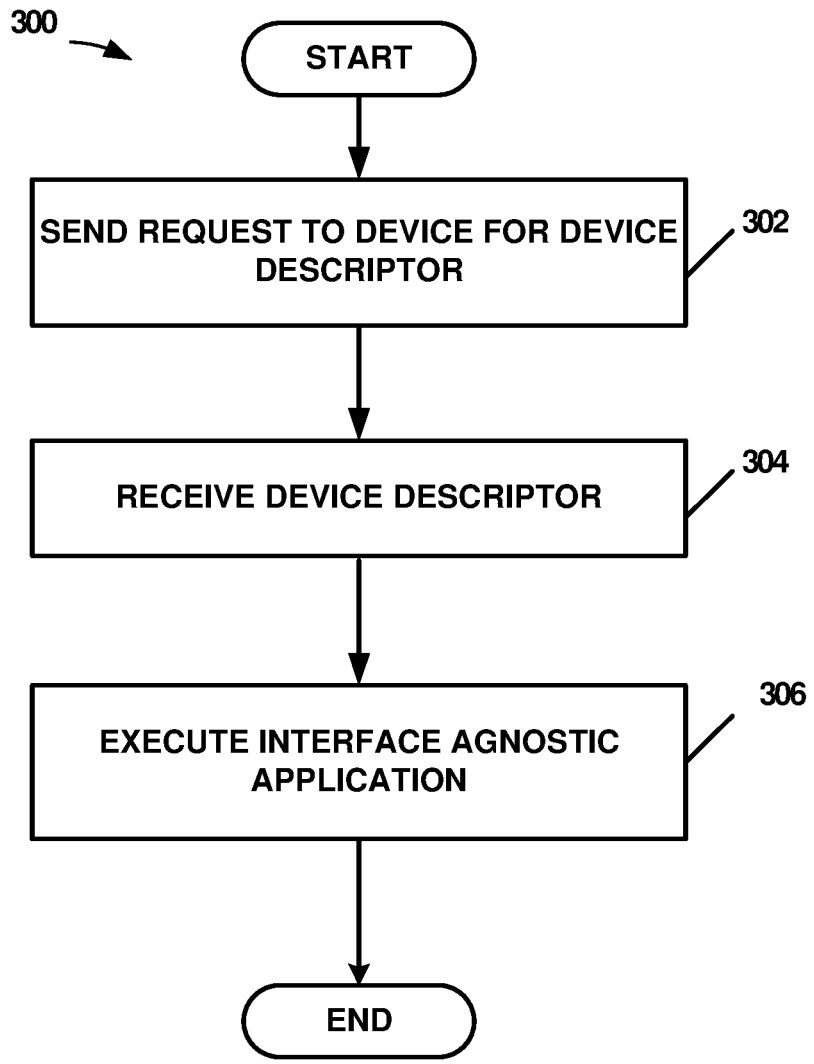
FIG. 3 illustrates an exemplary method for agnostically interpreting data, according to an example aspect.

Referring now to FIG. 3, an exemplary method 300 for agnostically interpreting data according to an example aspect is shown. Method 300 may be implemented on a computing device or a similar electronic device capable of executing instructions through at least one processor. Method 300 may begin at operation 302, where a request is sent to a device for a device descriptor that describes one or more custom interfaces. In one example, the one or more custom interfaces are expressed according to a defined data structure. The one or more custom interfaces may include at least a first custom interface and a second custom interface. In one example, a first device descriptor may describe the first custom interface and the second custom interface. The first custom interface may describe a first version of properties implemented by the device and the second custom interface may describe a second version of properties implemented by the device. The second version of properties implemented by the device may be an updated version of the first version of properties implemented by the device. For example, the device may add and implement a new feature described by the second custom interface. As such, another request may be sent to the device for a second device descriptor (e.g., after the second version of properties is added to the device) that describes at least the first custom interface and the second custom interface. In another example, another request may be sent to the device for a second device descriptor (e.g., after the second version of properties is added to the device) that describes a new custom interface. In this example, the new custom interface may describe the second version of properties implemented by the device (i.e., the new custom interface describes an updated version of the first version of properties implemented by the device).

When a request is sent to a device for a device descriptor that describes one or more custom interfaces, flow proceeds to operation 304 where the device descriptor that describes the one or more custom interfaces is received. In one example, the device descriptor is received at a gateway. In another example, the device descriptor is received at an interface agnostic application. When the second version of properties implemented by the device is an updated version of the first version of properties implemented by the device, the second device descriptor that describes at least the first custom interface and the second custom interface may be received (e.g., at a gateway). In one example, the device descriptor may be received at the gateway via a standard communication protocol while the one or more custom interfaces described by the device descriptor are expressed according to the defined data format discussed herein. As such, the one or more custom interfaces are not defined according to an industry standard.

When the device descriptor that describes the one or more custom interfaces is received, flow proceeds to operation 306 where an interface agnostic application is executed to translate the device descriptor to the one or more custom interfaces. The interface agnostic application may include any software and/or any software application that is capable of agnostically interpreting data from the device. When the second version of properties implemented by the device is an updated version of the first version of properties implemented by the device, the interface agnostic application may be executed to translate the second device descriptor to the first custom interface and the second custom interface. In this regard, the data described by the first custom interface and the data described by the updated second custom interface may be parsed, translated, and interpreted by the interface agnostic application without requiring that software associated with the updated second custom interface for interpreting the data described by the updated second custom interface be installed on the gateway.

Figure 4:
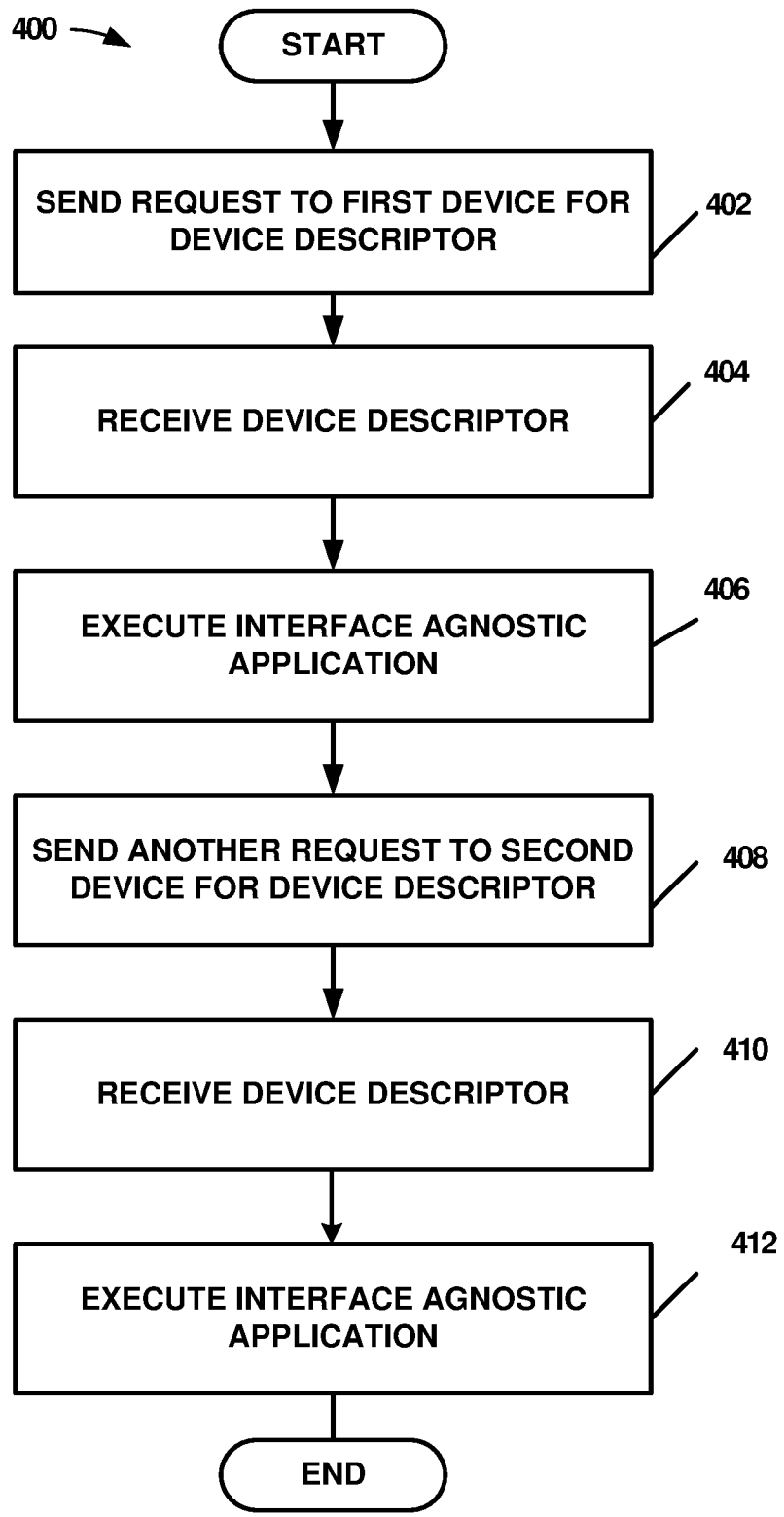
FIG. 4 illustrates an exemplary method for agnostically interpreting data from different devices, according to an example aspect.

Referring now to FIG. 4, an exemplary method 400 for agnostically interpreting data from different devices according to an example aspect is shown. Method 400 may be implemented on a computing device or a similar electronic device capable of executing instructions through at least one processor. Method 400 may begin at operation 402, where a request is sent to a first device for a device descriptor corresponding to the first device that describes one or more custom interfaces of the first device. In one example, the request is sent to the first device for the device descriptor from a gateway connected to the first device. In another example, the request is sent to the first device for the device descriptor from an interface agnostic application. The first device may be any device that can be controlled by a microprocessor. The first device may include both external devices and internal devices (e.g., integrated devices) capable of connecting to a gateway. For example, the first device may include a camera, a variety of analog and digital sensors (e.g., temperature, moisture/humidity, light, color, noise, positioning, particles, pressure, altitude, security, motion and the like), custom sensors, microcontroller units such as an Arduino, Inter-integrated circuit (I2C) sensors, a motor controller, Universal Serial Bus (USB) devices, Human Interface devices (HID), Bluetooth devices, and the like.

When a request is sent to a first device for a device descriptor corresponding to the first device that describes one or more custom interfaces of the first device, flow proceeds to operation 404, where the device descriptor corresponding to the first device is received. The device descriptor corresponding to the first device may be received at a gateway. In one example, the first device is connected to the gateway via a standard communication protocol such as serial ports (e.g., USB, RS-232), Wi-Fi, Bluetooth, Ethernet, and the like. The first device may communicate via a first protocol or a second protocol. The device descriptor may describe one or more interfaces that are implemented by the first device. The one or more interfaces may be expressed according to a defined data structure. In one example, the defined data structure is in a JavaScript Object Notation (JSON) format. In another example, the defined data structure is in a defined binary data format. The defined data structure may include a header followed by a list of descriptor entries. An entry marks either the start of a new interface definition or the start of a new property, event, or method definition within the previously started interface definition. Each entry begins with a single Entry Type field that provides an indication of the type of entry definition that follows. At least one interface is defined in the device descriptor and includes at least one of a property, an event, and a method definition. In one example, the device descriptor may describe between 1 and 256 interfaces that are implemented by the first device. In this regard, the one or more interfaces describe at least one of a property, an event, and a method definition from the first device.

When the device descriptor corresponding to the first device is received, flow proceeds to operation 406, where an interface agnostic application is executed to translate the device descriptor corresponding to the first device to the one or more custom interfaces of the first device. The interface agnostic application may include any software and/or any software application that is capable of agnostically interpreting data from the first device. In one example, the data interpreted from the first device may include properties, events, methods, commands, and the like, described by the one or more interfaces. In another example, the data interpreted from the first device may include payload (e.g., raw) data. The interface agnostic application may be configured to translate the device descriptor to the one or more interfaces for local use and/or for exposure to a cloud environment. In one example, the interface agnostic application is agnostic to metadata associated with the first device. For example, the interface agnostic application may be agnostic to metadata such as a first device type, a version of the first device, manufacturing information associated with the first device, and the like. In another example, the interface agnostic application is agnostic to metadata associated with the one or more custom interfaces. For example, the interface agnostic application may be agnostic to metadata such as an interface type, a version of an interface, manufacturing information associated with an interface, and the like.

When an interface agnostic application is executed to translate the device descriptor corresponding to the first device to the one or more custom interfaces of the first device, flow proceeds to operation 408 where another request is sent to a second device for a device descriptor corresponding to the second device that describes one or more custom interfaces of the second device. In one example, the request is sent to the second device for the device descriptor from a gateway connected to the second device. The second device may be any device that can be controlled by a microprocessor. In one example, the second device may include both external devices and internal devices (e.g., integrated devices) capable of connecting to the gateway. For example, the second device may include a camera, a variety of analog and digital sensors (e.g., temperature, moisture/humidity, light, color, noise, positioning, particles, pressure, altitude, security, motion and the like), custom sensors, microcontroller units such as an Arduino, Inter-integrated circuit (I2C) sensors, a motor controller, Universal Serial Bus (USB) devices, Human Interface devices (HID), Bluetooth devices, and the like. In some examples, the one or more custom interfaces of the second device include interfaces that are not defined/standardized by industry. For example, one or more custom interfaces may be implemented by any device that can be controlled by a microprocessor. In one example, the one or more custom interfaces are defined and/or expressed according to a defined data structure.

When another request is sent to a second device for a device descriptor corresponding to the second device that describes one or more custom interfaces of the second device, flow proceeds to operation 410 where the device descriptor corresponding to the second device is received. In one example, the device descriptor corresponding to the second device is received at a gateway. In one example, the second device is connected to the gateway via a standard communication protocol such as serial ports (e.g., USB, RS-232), Wi-Fi, Bluetooth, Ethernet, and the like. In one example, the second device is a different type of device than the first device discussed above relative to operations 402, 404, and 406. As such, the second device may communicate via a different protocol than the first device. In one example, the device descriptor corresponding to the second device is received via a standard communication protocol while the one or more custom interfaces described by the device descriptor are expressed according to a defined data format.

When the device descriptor corresponding to the second device is received, flow proceeds to operation 412 where the interface agnostic application is executed to translate the device descriptor corresponding to the second device to the one or more custom interfaces of the second device. The interface agnostic application may include any software and/or any software application that is capable of agnostically interpreting data from the second device. In one example, the data interpreted from the second device may include properties, events, methods, commands, and the like, described by the one or more interfaces. In another example, the data interpreted from the second device may include payload (e.g., raw) data. In this regard, the interface agnostic application may interpret data from a variety of devices (e.g., the first device discussed above relative to operations 402, 404, and 406 and the second device) including devices that do not define functionality/data using industry standards. (e.g., the first device discussed above relative to operations 402, 404, and 406 and the second device) without requiring that software associated with the first device and the second device be installed and implemented on the gateway. As such, the interface agnostic application may interpret data described by the one or more custom interfaces implemented by the first device and the second device without prior knowledge of the first device and/or the second device.

Figure 5:
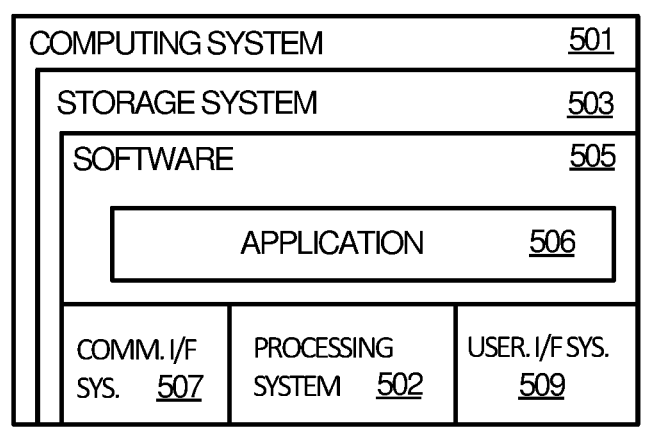
FIG. 5 illustrates a computing system suitable for implementing the enhanced self-described interface technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the interface agnostic application discussed with respect to the preceding FIGS. 1-4. When executed by processing system 502 to enhance self-described interface systems, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced self-described interface systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include compliance tool 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced self-described interface systems. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents a computer-implemented method for agnostically interpreting data, the computer-implemented method comprising: sending a request to a device for a device descriptor that describes one or more custom interfaces, wherein the one or more custom interfaces are expressed according to a defined data structure; receiving the device descriptor that describes the one or more custom interfaces; and executing an interface agnostic application to translate the device descriptor to the one or more custom interfaces. In further examples, the computer-implemented method further comprises receiving payload data associated with the one or more custom interfaces from the device; and parsing the payload data for local use or exposure to a cloud environment. In further examples, the computer-implemented method further comprises exposing the payload data to a local application for consumption. In further examples, the computer-implemented method further comprises exposing the payload data to the cloud environment for consumption. In further examples, the computer-implemented method further comprises sending a command to the device based on an analysis of the payload data. In further examples, the interface agnostic application is agnostic to device metadata including at least a type of the device, a version of the device, and manufacturing information associated with the device. In further examples, the interface agnostic application is agnostic to metadata associated with the one or more custom interfaces including at least a type of the one or more custom interfaces, a version of the one or more custom interfaces, and manufacturing information associated with the one or more custom interfaces. In further examples, the one or more custom interfaces describe at least one of a property, an event, and a method definition from the device.

Further aspects disclosed herein provide an exemplary system comprising one or more computer readable storage media; and program instructions stored on the one or more computer readable storage media that, when executed by at least one processor, cause the at least one processor to at least: send a request to a device for a first device descriptor that describes a first custom interface; receive the first device descriptor describing the first custom interface; execute an interface agnostic application to translate the first device descriptor to the first custom interface; send another request to the device for a second device descriptor that describes at least the first custom interface and a second custom interface; receive the second device descriptor describing at least the first custom interface and the second custom interface; and execute the interface agnostic application to translate the second device descriptor to at least the first custom interface and the second custom interface. In further examples, the first custom interface is expressed according to a defined data structure. In further examples, the second custom interface is expressed according to the defined data structure. In further examples, the defined data structure is in at least one of a JavaScript Object Notation (JSON) format and a defined binary data format. In further examples, the first custom interface describes a first version of properties implemented by the device. In further examples, the second custom interface describes a second version of properties implemented by the device. In further examples, the second version of properties from the device is an updated version of the first version of properties from the device.

Further aspects disclosed herein provide an exemplary apparatus comprising: one or more computer readable storage media; and program instructions stored on the one or more computer readable storage media that, when executed by a processing system, direct the processing system to at least: send a request to a first device for a device descriptor corresponding to the first device that describes one or more custom interfaces of the first device; receive the device descriptor corresponding to the first device; execute an interface agnostic application to translate the device descriptor corresponding to the first device to the one or more custom interfaces of the first device; send another request to a second device for a device descriptor corresponding to the second device that describes one or more custom interfaces of the second device; receive the device descriptor corresponding to the second device; and execute the interface agnostic application to translate the device descriptor corresponding to the second device to the one or more custom interfaces of the second device. In further examples, the first device communicates via a first communication protocol and the second device communicates via a second communication protocol. In further examples, the first device is a different type of device than the second device. In further examples, the first device is an external peripheral device and the second device is an internal peripheral device. In further examples, the interface agnostic application is agnostic to metadata associated with the first device and the second device, wherein the metadata includes at least a type of the first device and the second device, a version of the first device and the second device, and manufacturing information associated with the first device and the second device.

Techniques for agnostically interpreting data are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of self-described interface systems that execute in conjunction with an interface agnostic application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A computer-implemented method for agnostically interpreting data, the computer-implemented method comprising:
   sending, by a computer, a first request to a device for a first device descriptor that describes a first custom interface, wherein the device is a peripheral device of the computer, and wherein the first custom interface describes a functionality at the peripheral device;
   receiving, by the computer, from the device, and based on the first request, the first device descriptor;
   execute, by the computer, an interface agnostic application to translate the first device descriptor to the first custom interface based at least on metadata of the device or metadata of the first custom interface;
   send, by the computer, a second request to the device for a second device descriptor that describes at least the first custom interface and a second custom interface, wherein the second custom interface describes the functionality at the peripheral device;
   receive, from the computer and based on the second request, the second device descriptor;
   execute, by the computer, the interface agnostic application to translate the second device descriptor to at least the first custom interface and the second custom interface based at least on the metadata of the device or metadata of the second custom interface; and
   sending, by the computer, at least the first custom interface and the second customer interface to a cloud environment to allow at least one other service, component, or interface, connected to the cloud environment, to interact with the device.

2. The computer-implemented method of claim 1, further comprising:
   receiving payload data associated with at least one of the first and second custom interfaces from the device; and parsing the payload data for local use or exposure to the cloud environment.

3. The computer-implemented method of claim 2, further comprising exposing the payload data to a local application for consumption.

4. The computer-implemented method of claim 3, further comprising sending a command to the device based on an analysis of the payload data.

5. The computer-implemented method of claim 1, wherein the metadata of the device includes at least one of a type, a version, and manufacturing information associated with the device.

6. The computer-implemented method of claim 1, wherein the metadata associated with at least one of the first and second custom interfaces including at least one of a type, a version, and manufacturing information associated with the at least one of the first and second custom interfaces.

7. The computer-implemented method of claim 1, wherein at least one of the first and second custom interfaces describes at least one of a property, an event, and a method definition from the device.

8. A system comprising:
one or more computer readable storage media; and
program instructions stored on the one or more computer readable storage media that, when executed by at least one processor, cause the at least one processor to at least:
send a first request to a device for a first device descriptor that describes a first custom interface, wherein the device is a peripheral device of the system, and wherein the first custom interface describes a functionality at the peripheral device;
receive, from the device and based on the request, the first device descriptor describing the first custom interface;
execute an interface agnostic application to translate the first device descriptor to the first custom interface based at least on metadata of the device or metadata of the first custom interface;
send a second request to the device for a second device descriptor that describes at least the first custom interface and a second custom interface, wherein the second custom interface describes the functionality at the peripheral device;
receive, from the device and based on the second request, the second device descriptor describing at least the first custom interface and the second custom interface;
execute the interface agnostic application to translate the second device descriptor to at least the first custom interface and the second custom interface based at least on the metadata of the device or metadata of the second custom interface; and
send at least the first custom interface and the second custom interface to a cloud environment to allow at least one other service, component, or interface, connected to the cloud environment, to interact with the device.

9. The system of claim 8, wherein the first custom interface is expressed according to a defined data structure.

10. The system of claim 9, wherein the second custom interface is expressed according to the defined data structure.

11. The system of claim 9, wherein the defined data structure is in at least one of a JavaScript Object Notation (JSON) format and a defined binary data format.

12. The system of claim 8, wherein the first custom interface describes a first version of properties implemented by the device.

13. The system of claim 12, wherein the second custom interface describes a second version of properties implemented by the device.

14. The system of claim 13, wherein the second version of properties from the device is an updated version of the first version of properties from the device.

15. One or more computer readable storage media having program instructions stored thereon that, when executed by a processing system, direct the processing system to at least:
send a first request to a first device for a device descriptor corresponding to the first device that describes a first custom interface of the first device, wherein the first device is a peripheral device of the processing system, and wherein the first custom interface of the first device describes a functionality at the peripheral device;
receive, from the first device and based on the first request, the device descriptor corresponding to the device;
execute an interface agnostic application to translate the first device descriptor corresponding to the device to the first custom interface of the device based at least on metadata of the device or metadata of the first custom interface;
send a second request to the device for a second device descriptor corresponding to the device that describes a second custom interface of the device, wherein the second custom interface of the device describes the functionality at the peripheral device;
receive, from the device and based on the second request, the second device descriptor corresponding to the device;
execute the interface agnostic application to translate the second device descriptor corresponding to the device to at least the first custom interface and the second custom interface of the second device based at least on the metadata of the device or metadata of the second custom interface; and
send at least the first custom interface and the second custom interface to a cloud environment to allow at least one other service, component, or interface, connected to the cloud environment, to interact with the device.

16. The one or more computer readable storage media of claim 15, wherein the device communicates via one or more communication protocols.

17. The one or more computer readable storage media of claim 16, wherein the device is a type associated with the one or more communication protocols.

18. The one or more computer readable storage media of claim 15, wherein the device is one of an external peripheral device and an internal peripheral device.

19. The one or more computer readable storage media of claim 15, wherein the metadata includes at least one of a type, a version, and manufacturing information associated with the device.

* * * * *